United States Patent [19]

Sheng

[11] Patent Number: 4,910,739
[45] Date of Patent: Mar. 20, 1990

[54] ADJUSTABLE APERTURE

[75] Inventor: Shinan-Chur S. Sheng, Sunnyvale, Calif.

[73] Assignee: Spectra-Physics, San Jose, Calif.

[21] Appl. No.: 170,541

[22] Filed: Mar. 21, 1988

[51] Int. Cl.$^4$ .............................................. H01S 3/098
[52] U.S. Cl. ........................................ 372/19; 372/98; 372/103; 350/319
[58] Field of Search .......................... 372/19, 98, 103; 350/319

[56] References Cited

U.S. PATENT DOCUMENTS

| 3,362,313 | 1/1968 | Wollensak et al. | 354/274 |
| 3,413,568 | 11/1968 | Gordon et al. | 372/103 |
| 3,426,293 | 2/1969 | Snitzer | 372/103 |
| 3,518,339 | 6/1970 | Goff | 350/319 |
| 3,868,702 | 2/1975 | Strauss et al. | 354/270 |
| 3,922,699 | 11/1975 | Yamaki | 354/270 |
| 3,936,770 | 2/1976 | Reintjes, Jr. et al. | 372/19 |
| 4,675,500 | 6/1987 | Kunz et al. | 372/103 |
| 4,751,706 | 6/1988 | Rohde et al. | 372/103 |

FOREIGN PATENT DOCUMENTS

| 0013785 | 1/1982 | Japan | 372/19 |
| 0160188 | 8/1985 | Japan | 372/103 |
| 0160189 | 8/1985 | Japan | 372/103 |
| 0276387 | 12/1986 | Japan | 372/103 |
| 1191867 | 11/1985 | U.S.S.R. | 354/270 |

Primary Examiner—Frank Gonzalez
Attorney, Agent, or Firm—Fliesler, Dubb, Meyer & Lovejoy

[57] ABSTRACT

An adjustable aperture is formed by a plurality of spring members secured over a passage on a frame, each spring member having a first end secured to the frame, a body extending into the passage and a second end opposite the first. The flexible members are mounted so that the plurality of second ends of the spring members form the aperture. A plunger, secured to the frame and contacting the bodies of the spring members, is provided for deflecting the spring members in an adjustable mount along the axis of light going through the passage. By deflecting the spring members which are fixed to the frame, the size of the aperture formed by the second ends of the spring members can be adjusted. The aperture formed is well suited for control of transverse modes in lasers.

28 Claims, 3 Drawing Sheets

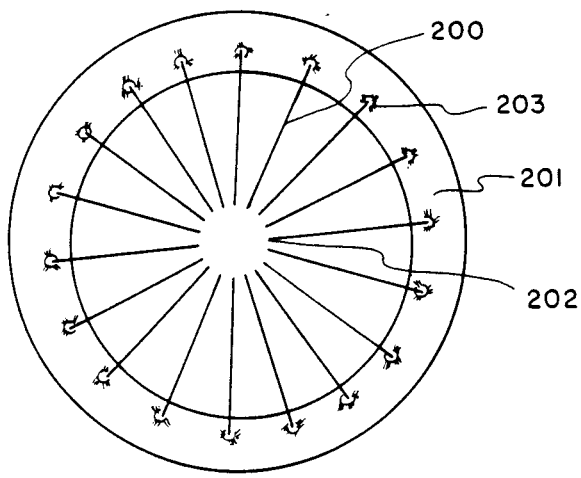
FIG. 8
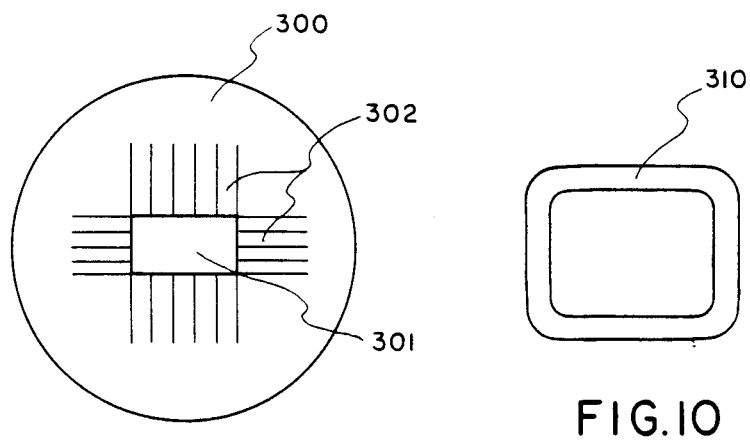
FIG. 9
FIG. 10

ADJUSTABLE APERTURE

BACKGROUND OF THE INVENTION

1. Field of the Invention

The present invention relates to adjustable apertures, and more particularly, to adjustable apertures suitable for use in controlling transverse modes in lasers.

2. Description of Related Art

A variety of applications exists for adjustable apertures by which the amount of light that passes through a given passage can be regulated. For instance, photographic systems typically use irises that consist of a plurality of overlapping leaves that form an aperture around their inner perimeter. The position of the leaves is controlled in order to adjust the size of the aperture.

In lasers, apertures are often used to suppress transverse modes of laser oscillation. A given laser cavity can support a number of transverse modes so that a number of different wavelengths and geometries of laser oscillation are set up within the cavity. In order to ensure a uniform beam at the center of the cavity, all transverse modes except a preferred mode designated $TEM_{00}$ must be suppressed. This suppression can be accomplished by placing an aperture within the laser cavity that blocks oscillation of laser light in the geometry required to set up the desired transverse mode.

Many laser mediums will lase at a variety of wavelengths. The cross-sectional size of the transverse modes in those lasers will vary depending on the wavelength of light desired to be supported. For shorter wavelengths the mode size of the laser beam is smaller, requiring a small aperture in order to suppress the high order transverse modes. For longer wavelengths, the transverse modes have larger cross-sectional sizes. Therefore, a larger aperture is required to allow the desired mode to survive while suppressing the unwanted higher order transverse modes.

Prior art systems providing adjustable mode control apertures in lasers have used a wheel having a plurality of pre-cut apertures. The wheel is turned so that the desired aperture is placed in alignment with the laser beam. If the wavelength to be produced by the laser is changed, the wheel is turned to align a different aperture with the beam. Obviously an ifis-type aperture, common in photographic systems, could be used as well to control transverse modes of lasers.

The disadvantages of using the wheel having a plurality of pre-cut apertures, arise from difficulty in fabricating the wheel. Each aperture must be precisely aligned, with the center of each aperture being an equal distance from the center of the wheel, so that as the wheel turns and a new aperture becomes aligned with the beam, the aperture will remain centered on the beam. Due to the precision required in manufacturing, the aperture wheel becomes costly. Further, because of the precise alignment required to mount the wheel, the reliability of the aperture to produce high quality mode suppression is reduced.

Iris-type apertures are difficult to manufacture in a manner that provides precise control of the desired aperture size for mode suppression in lasers. Further, they involve a large number of pieces that must be assembled in precision manufacturing.

Accordingly, it is desirable to provide an aperture that is continuously adjustable, easy to manufacture and that can be adjusted with a high degree of reliability. Such an aperture would be particularly suited to mode control in lasers.

SUMMARY OF THE INVENTION

The present invention provides an apparatus for defining the size of an aperture which is continuously adjustable, simple to manufacture and suitable for use in mode control for lasers.

According to one aspect of the invention, the apparatus comprises a frame having a passage through which light will pass. A plurality of flexible members, each flexible member having a first end secured to the frame, a body extending into the passage and a second end opposite the first, are mounted so that the plurality of second ends of the flexible members defines the size of an aperture over the passage. A means, secured to the frame and contacting the bodies of the flexible members, is provided for deflecting the flexible members in an adjustable mount along the axis of the light going through the passage. By deflecting the flexible members which are fixed to the frame, the size of the aperture defined by the second ends of the flexible members will increase. Preferably, the flexible members are spring members that press against the means for deflecting to maintain contact as the size of the aperture is varied.

According to a second aspect of the invention, the spring members are formed from a single sheet of a spring material. The sheet of spring material has an outer perimeter and is secured over the passage near the outer perimeter of the sheet of spring material. Each spring member has a first end near the frame, a body extending away from the outer perimeter into the passage and a second end opposite the first. The second ends of the plurality of spring members on the sheet of spring material define the perimeter of the aperture. The means for deflecting the spring members comprises a plunger that has a spring contact end and a mounting end that define an axis. A passage through the plunger allows light to pass along the axis of the plunger. The plunger contacts the bodies of the plurality of spring members at the spring contact end and is coupled to the frame at the mounting end in a manner that permits setting the amount of deflection. For instance, the frame may include a threaded inner surface and the plunger may include a mounting surface near the mounting end, threaded in a manner to couple with the threaded inner surface of the frame. By rotating the plunger engaged by its threaded surface with the frame, the position of the plunger relative to the frame can be continuously varied. By varying the position of the plunger relative to the frame, the amount of deflection of the spring members is likewise varied and the size of the aperture can be precisely controlled.

According to yet another aspect of the invention, an apparatus for controlling transverse modes of a laser is provided, comprising an aperture frame mounted within the laser cavity, and having a passage along the axis of the laser so that the laser beam passes through the passage. The plurality of spring members is secured to the frame, with the bodies of the spring members extending into the passage defining an aperture perpendicular to the laser beam. A means for deflecting the spring members is secured to the frame, contacting the bodies of the spring members in order to set the size of any aperture. Transverse modes having cross-sectional dimensions larger than the aperture are thereby suppressed.

Other features of the present invention can be determined by study of the specification, drawings and claims.

BRIEF DESCRIPTION OF THE DRAWINGS

FIG. 8 is a diagram of an aperture formed by a plurality of flexible wires bonded to a frame according to the present invention.

FIG. 9 is a diagram of a non-circular aperture according to the present invention.

FIG. 10 is a cross-sectional view illustrating the shape of a plunger which should be used in a system with a rectangular aperture, such as shown in FIG. 9.

DESCRIPTION OF THE PREFERRED EMBODIMENTS

A detailed description of the preferred embodiment of the present invention is described. With reference to FIGS. 1-4, the preferred embodiment of the continuously adjustable aperture according to the present invention is provided.

Figure 3:
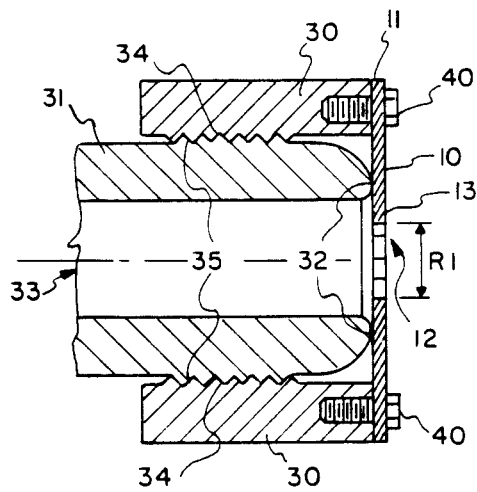
FIG. 3 is a cross-sectional view of the apparatus according to the present invention in which the plurality of spring members are not deflected.
Figure 4:
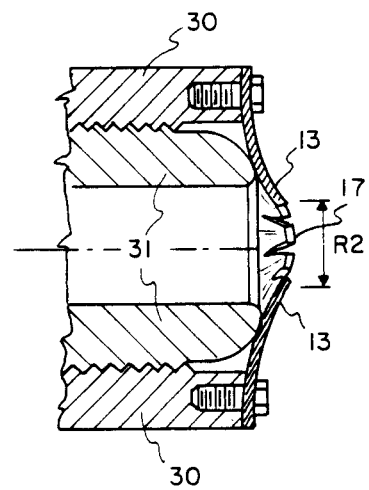
FIG. 4 is a diagram of the apparatus according to the present invention in which the plurality of spring members are deflected in order to increase the size of the aperture.
Figure 5:
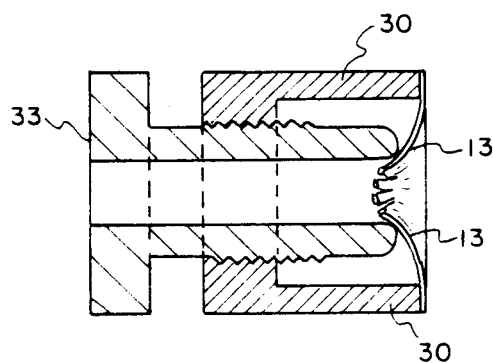
FIG. 5 is an alternate embodiment of the apparatus of the present invention.

With reference to FIG. 5, an alternate embodiment is described in which the spring members tend to deflect in an opposite direction relative to those in FIGS. 3 and 4.

Figure 6:
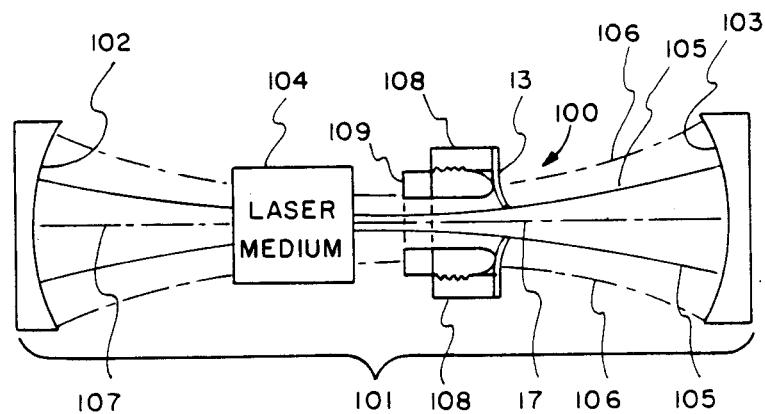
FIG. 6 is a schematic diagram of a laser system employing the present invention for suppression of transverse modes.
Figure 7:
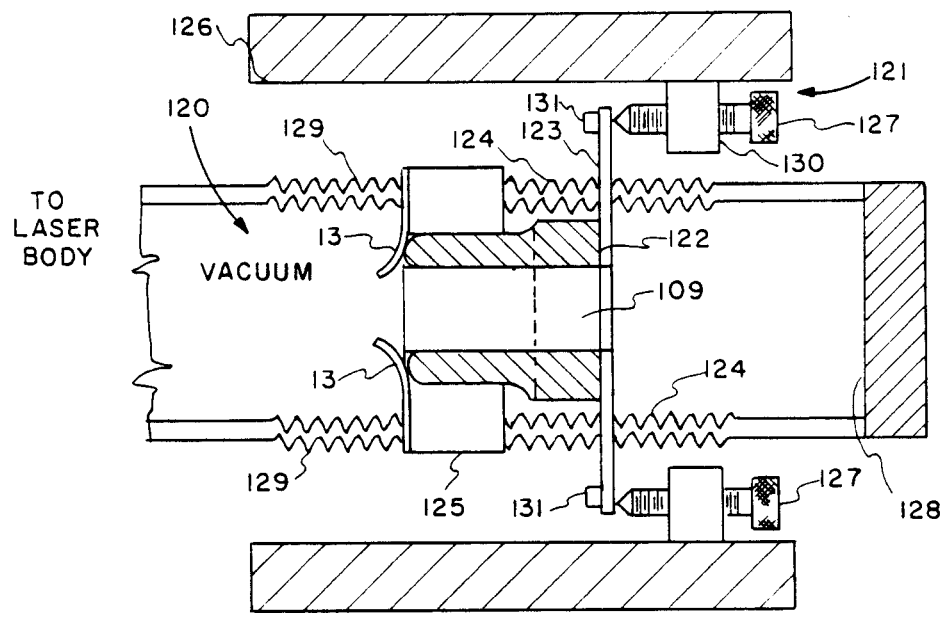
FIG. 7 is a diagram illustrating an embodiment for mounting a mode control aperture according to the present invention within a partially evacuated chamber within a laser cavity.

With reference to FIGS. 6 and 7, implementation of the continuously adjustable aperture for use in transverse mode control in lasers, is described. In particular, in FIG. 7, the continuously variable aperture according to the present invention is mounted within a partially evacuated chamber of a laser.

With reference to FIGS. 8, 9 and 10, alternative embodiments of the continuously adjustable aperture according to the present invention, are described in order to illustrate that the range of equivalent structures is quite broad.

Figure 1:
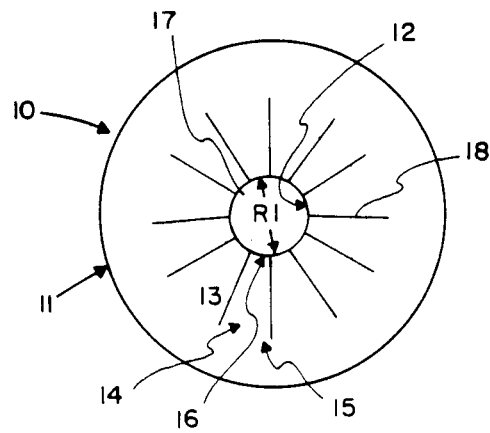
FIG. 1 is a sheet of spring material of a diaphragm forming a plurality of flexible spring members according to the present invention which define an aperture.

FIG. 1 is a diagram of a sheet of spring material 10 having an outer perimeter 11 and an inner perimeter 12. A plurality of flexible spring members 13 is formed from the sheet of spring material 10. Each of the spring members includes a first end 14, a spring body 15 and a second end 16. The plurality of second ends 16 define the inner perimeter 12 of the sheet of spring material. The inner perimeter 12 of the sheet of spring material in turn defines the perimeter of an aperture 17 having a radius R1 in FIG. 1.

The sheet of spring material 10 is preferably manufactured of inconel 718, beryllium copper or another steel alloy having excellent spring characteristics. It can be manufactured using photolithographic etching techniques in order to provide a high precision manufacturing, such that the spring members are identical for large numbers of devices. Further, the cuts 18 between each of the spring members 13 can be precisely aligned. The thickness of the sheet of spring material 10 used in the preferred embodiment is in the order of 10 mils.

Figure 2:
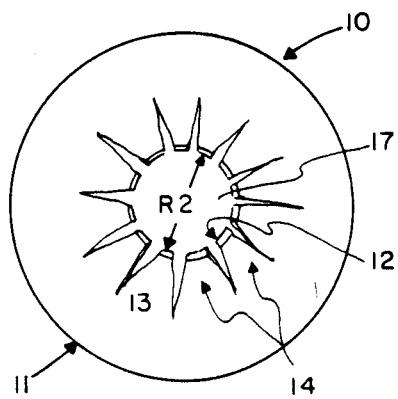
FIG. 2 is a sheet of spring material of the diaphragm illustrated in FIG. 1 in which the plurality of spring members has been deflected in order to increase the size of the aperture.

FIG. 2 illustrates how the size of the aperture 17 can be increased by deflecting the spring members 13 in a direction perpendicular to the plane of the aperture.

The plurality of first ends 14 of the spring members 13 define a plane. The spring members 13 can be deflected in a direction perpendicular to the plane defined by the plurality of first ends 14. By deflecting the plurality of spring members perpendicularly to the plane of the paper, the size of the aperture 17 increases. Obviously, the shape of the aperture 17 is not a perfect circle; rather, it has a star effect because of the separation of the spring members 13 upon deflection. However, this has little or no impact on the suitability of the aperture for controlling the geometry of light passing through the aperture. Particularly, the edges of the spring members will cause additional scattering of light that is effective in enhancing the transverse mode control.

FIG. 3 illustrates the preferred embodiment of the continuously adjustable aperture according to the present invention, employing the sheet of spring material 10. The sheet of spring material 10 is secured to a frame 30 near the outer perimeter 11 of the sheet of spring material. The frame 30 includes a passage through which light may pass. The spring members 13 of the sheet of spring material 10 extend radially into the passage such that the inner perimeter 12 of the sheet of spring material defines an aperture having a radius R1 when the spring members are not deflected.

A plunger 31 is mounted with the frame. The plunger 31 includes a spring contact end 32 and a mounting end 33. The spring contact end 32 contacts the bodies of the spring members 13. The frame 30 includes a threaded inner surface 34. The plunger includes a mounting surface 35 near the mounting end 33 that is adapted to couple with the threaded inner surface of the frame 30. By rotating the plunger 31, its position relative to the frame can be adjusted. Thereby, the amount of deflection of the spring members 13 on the sheet of spring material 10 can be continuously adjusted by setting the position of the plunger 31 with respect to the frame. The plunger 31 can be manufactured of any material that is resistant to incident laser light. Further, in the vacuum embodiment described below with reference to FIG. 7, the plunger 31 could be manufactured of a vacuum-compatible material, such as ceramics, invar or other iron-based alloy.

By adjusting the position of the plunger 31 with respect to the frame 30, as illustrated in FIG. 4, the spring members 13 will be deflected away from the plunger. By deflecting the spring members 13, the radius of the aperture 17 is increased to the radius R2. The spring members 13 tend to maintain contact with the plunger 31 so that when the position of the plunger 31 is adjusted, the position of the second ends of the spring members 13 changes accordingly. Therefore, the size of the aperture 17 can be continuously adjusted by adjusting the position of the plunger.

In the embodiment shown in FIG. 3, the sheet of spring material 10 is secured to the frame 30 by screws 40. Obviously, it can be secured using a variety of bonding techniques depending on the particular materials chosen for the frame and the sheet of spring material 10. Further, the plurality of spring members 13 can be individually manufactured and secured to the frame by a variety of well known techniques.

Further, the plunger 31 which provides a means for deflecting the plurality of spring members 13 an adjustable amount, can be secured with the frame 30 in a sliding relationship or other manner which ensure aligning the passage through the plunger 31 adapted to receive light, with the aperture 17 created by the plurality of spring members.

It can be seen that the spring members 13 tend to close the aperture to the radius R1 by a force against the contact end 32 of the plunger 33. FIG. 5 illustrates an alternative embodiment of the spring members 13 in which they tend to open the aperture unless deflected by the plunger 33.

FIG. 6 illustrates utilization of the continuously variable aperture 100 for control of transverse modes in the laser. The laser includes a laser cavity 101 which is defined by a first reflective surface 102 and a second reflective surface 103. A laser medium 104 within the laser cavity 101 generates laser light to support laser oscillation. The low-order transverse modes of laser oscillation can be supported within a cross-sectional area indicated by lines 105. Unwanted transverse modes require greater cross-sectional area in which to be supported within the laser cavity as shown by the dotted lines 106. By placing a continuously adjustable aperture 100 according to the present invention, within the laser cavity, the transverse modes having a cross-sectional dimension greater than the size of the aperture 17, are suppressed.

The laser shown in FIG. 6 generates a laser beam having a direction generally defined by a laser axis 107. The apparatus 100 includes an aperture frame 108 mounted within the laser cavity and having a passage along the laser axis so that the laser beam passes through the passage. The plurality of spring members 13 is secured to the aperture frame 108 near a first end and extends into the passage of the aperture frame such that the second end of the spring members defines the size of the aperture 17. The plunger 109 is secured to the frame 108 and contacts the bodies of the spring members 13. It is adapted to deflect the second ends of the spring members 13 an adjustable amount, parallel to the laser axis so that the second ends of the spring members define an aperture essentially perpendicular to the laser axis. Transverse modes having cross-sectional dimensions larger than the defined aperture are thereby suppressed.

FIG. 7 illustrates a portion of the laser including a partially evacuated chamber 120. The plunger 109 for deflecting the spring members 13 and the plurality of spring members 13 are contained within the chamber 120. Further, a means 121 is provided that is coupled to the plunger 109 for setting the adjustable amount of deflection from outside the partially evacuated chamber 120. In the embodiment shown in FIG. 7, the plunger 109 includes a mounting end 122 with a plate 123 that extends outside the chamber 120. A vacuum bellow 124 is coupled to the plate 123 such that the position of the plate 123 relative to the plurality of spring members 13 can be adjusted without breaking the vacuum of the chamber 120. The plunger 109 is coupled to the aperture frame 125 on which the plurality of spring members 13 is secured, in a sliding relationship such that rotation of the plunger 109 is not required in order to set the position.

The vacuum chamber 120 is secured to a laser frame 126. The means 121 for adjusting the position of the plunger 109 comprises an adjustable screw 127 mounted on the laser frame 126 and coupled to the plate 123. By varying the position of the screw 127 with respect to the laser frame 126, the position of the plunger 109 relative to the plurality of spring members 13 can be continuously adjusted from outside the partially evacuated chamber 120 of the laser. The chamber 120 as illustrated in FIG. 7, ends with a reflective surface 128.

A vacuum bellows material may be used on the side opposite the mounting end 122 of the plunger 109, for a short section 129 if desired, to provide greater flexibility in operation of the continuously adjustable aperture.

Obviously, other mechanisms for controlling the position of the plunger 109 relative to the plurality of spring members 13 and the aperture frame 125 could be employed. For instance, for the purposes of the present invention, equivalent means for controlling the position of the plunger might include vacuum telemetry techniques, or stepper motors or the like that provide very fine control over the position of the plunger 109 from outside the chamber.

In the embodiment illustrated, the screws 127 would be coupled to the laser frame 126 by an arm 130 that is adapted to receive the screw 127. The end 131 of the screw 127 would include a nipple adapted to secure the plate 123 to the end 131 of the screw 127 so that motion of the screw in both directions parallel to the axis of motion of the plunger 109, can be precisely controlled by the position of the screw 127. The thread ratio of the screw 127 is preferably very fine so that very slight changes in position of the plate 123 can be achieved. Of course, many gear reduction schemes can be employed to provide precise control of the position of the screws 127.

Alternative structures forming the aperture according to the present invention, are illustrated with reference to FIGS. 8 through 10. In FIG. 8, a plurality of flexible members 200 are formed using flexible wires bonded to a frame 201. The flexible wires 200 are preferably formed of stiff steel or spring material bonded to the frame 201 at a first end 203 of each wire using spot-welding techniques. The inner ends 202 of the flexible wires 200 define an aperture which can be continuously adjustable using a plunger mechanism as illustrated in FIG. 3.

FIG. 9 illustrates a sheet of spring material 300 containing a rectangular aperture 301. This sheet of spring material 300 can be secured over passages as described with reference to the sheet of spring material of FIG. 1 to provide a continuously variable aperture essentially rectangular in shape. Obviously, other shapes can be implemented as suits a particular application. The plunger utilized to deflect the flexible members 302, would have a shape as illustrated in FIG. 10. As can be seen, the shape of the plunger 310 is formed to match the shape of the aperture 301 and the flexible members 302 illustrated in FIG. 9.

As shown in FIGS. 8 and 9, the continuously variable aperture, according to the present invention, can take on a wide range of equivalent structures which is characterized by a plurality of flexible members which define an aperture around an inner perimeter. Flexible members can be deflected in order to adjust the size of the aperture.

Conclusion

According to the present invention, a continuously adjustable aperture providing a wide dynamic range, is provided. The size of the aperture 17 can easily accommodate dimensions on the order of 1 mil using photolithographic techniques for manufacturing the aperture. Further, the aperture is simple and can be inexpensively manufactured with high precision. Finally, the aperture is suitable for use with any laser, and in particular, lasers that include an evacuated chamber within the laser cavity.

The foregoing description of the preferred embodiments of the present invention has been presented for purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. An apparatus forming an aperture having an adjustable size, comprising:
   a frame having a passage through which light may pass;
   a plurality of flexible members, each flexible member having a first end secured to the frame, a body extending into the passage, and a second end opposite the first end, the plurality of second ends forming the aperture, the aperture having a center; and
   means, secured to the frame and contacting the bodies of the flexible members, for bending the flexible members to deflect the second ends of the flexible members in adjustable amounts with respect to the center of the aperture, so that the size of the aperture is determined by the adjustable amount of deflection.

2. The apparatus of claim 1, wherein the means for bending the flexible members comprises:
   a plunger, having a contact end and a mounting end defining an axis and a passage along the axis through which light may pass, the plunger contacting the bodies of the plurality of flexible members at the contact end and coupled to the frame near the mounting end in an adjustable manner setting the amounts of deflection.

3. The apparatus of claim 2, wherein the frame includes a threaded inner surface substantially parallel to the passage through the plunger, and the plunger includes a threaded mounting surface near the mounting end adapted to couple with the threaded inner surface of the frame.

4. The apparatus of claim 1, wherein the aperture is essentially circular.

5. An aparatus forming an aperture having an adjustable size, comprising:
   a frame having a passage through which light may pass;
   a sheet of spring material having an outer perimeter and an aperture spaced away from the outer perimeter through which light may pass, the sheet of spring material secured to the frame over the passage near the outer perimeter;
   the sheet of spring material having a plurality of cuts extending from near the outer perimeter to the aperture which form a plurality of spring members, each spring member having a body extending from near the outer perimeter toward the aperture, and an end, and wherein the ends of the plurality of spring members define the aperture, the aperture having a center;
   means, mounted with the frame and contacting the bodies of the spring members, for bending the spring members to deflect the ends of the spring members in adjustable amounts with respect to the center of the aperture, so that the size of the aperture is determined by the adjustable amount of deflection.

6. The apparatus of claim 5, wherein the means for bending the spring members comprises:
   a plunger, having a spring contact end and a mounting end defining an axis and a passage along the axis through which light may pass, the plunger contacting the bodies of the plurality of spring members at the spring contact end and coupled to the frame near the mounting end in an adjustable manner setting the amounts of deflection.

7. The apparatus of claim 6, wherein the frame includes a threaded inner surface substantially parallel to the passage through the plunger, and the plunger includes a threaded mounting surface near the mounting end adapted to couple with the threaded inner surface of the frame.

8. The apparatus of claim 5, wherein the aperture is essentially circular.

9. An apparatus for controlling transverse modes of a laser having a resonant laser cavity defining a laser axis, the transverse modes having different cross-sectional dimensions perpendicular to the laser axis, the apparatus comprising:
   an aperture frame mounted within the laser cavity having a passage along the laser axis;
   a plurality of flexible members, each flexible member having a first end secured to the frame, a body extending into the passage, and a second end opposite the first end;
   means, secured to the aperture frame and contacting the bodies of the flexible members, for bending the flexible members to deflect the second ends of the flexible members in adjustable amounts with respect to the laser axis so that the second ends of the flexible members form an aperture having an adjustable size, so that transverse modes having cross-sectional dimensions larger than the size of the aperture are suppressed.

10. The apparatus of claim 9, wherein the laser includes a partially evacuated chamber, and the plurality of flexible members and the means for bending are within the chamber.

11. The apparatus of claim 10, further including:
   means, coupled to the means for deflecting, for setting the adjustable amount of deflection from outside the chamber.

12. The apparatus of claim 9, wherein the means for bending the flexible members comprises:

a plunger, having a contact end and a mounting end defining a plunger axis and a passage along the plunger axis, the plunger contacting the bodies of the plurality of flexible members at the contact end and coupled to the aperture frame near the mounting end so that the plunger axis coincides with the laser axis.

13. The apparatus of claim 12, wherein the aperture frame includes a threaded inner surface substantially parallel to the laser axis, and the plunger includes a threaded mounting surface near the mounting end adapted to couple with the threaded inner surface of the aperture frame, so that the plunger axis coincides with the laser axis and has an adjustable position relative to the aperture frame along the laser axis, whereby the adjustable amounts are set.

14. The apparatus of claim 12, wherein the aperture frame includes an inner surface substantially parallel to the laser axis, and the plunger includes a mounting surface near the mounting end coupled with the inner surface of the aperture frame to support the plunger so that the plunger axis coincides with the laser axis; and further including:
means, mounted with the aperture frame and coupled to the plunger, for setting the adjustable amounts by positioning the plunger relative to the aperture frame along the laser axis.

15. The apparatus of claim 12, wherein the laser includes a partially evacuated chamber, and the plunger and the plurality of flexible members are within the chamber.

16. The apparatus of claim 15, further including:
means, coupled to the plunger, for setting the adjustable amounts of deflection from outside the chamber.

17. The apparatus of claim 12, wherein the laser includes a partially evacuated chamber, and the plunger and the plurality of flexible members are within the chamber, and wherein:
the aperture frame includes an inner surface substantially parallel to the laser axis, and the plunger includes a mounting surface near the mounting end coupled with the inner surface of the aperture frame to support the plunger so that the plunger axis coincides with the laser axis; and further including:
means, mounted with the aperture frame and coupled to the plunger, for setting the adjustable amounts by positioning the plunger relative to the aperture frame along the laser axis from outside the chamber.

18. The apparatus of claim 9, wherein the aperture is essentially circular.

19. An apparatus for controlling transverse modes of a laser having a resonant laser cavity defining a laser axis, the transverse modes having different cross-sectional dimensions perpendicular to the laser axis, the apparatus comprising:
an aperture frame mounted within the laser cavity having a passage along the laser axis;
a sheet of spring material having an outer perimeter and an aperture spaced away from the outer perimeter through which light on the laser axis may pass, the sheet of spring material secured to the aperture frame over the passage near the outer perimeter;
the sheet of spring material having a plurality of cuts extending from near the outer perimeter to the aperture which form a plurality of spring members, each spring member having a body extending from near the outer perimeter toward the aperture, and an end, and wherein the ends of the plurality of spring members define a size of the aperture;
means, mounted with the aperture frame and contacting the bodies of the spring members, for bending the spring members to deflect the ends of the spring members in adjustable amounts with respect to the laser axis, so that the size of the aperture is adjusted and transverse modes having cross-sectional dimensions larger than the aperture are suppressed.

20. The apparatus of claim 19, wherein the laser includes a partially evacuated chamber, and the plurality of spring members and the means for bending are within the chamber.

21. The apparatus of claim 20, further including:
means, coupled to the means for bending, for setting the adjustable amount of deflection from outside the chamber.

22. The apparatus of claim 19, wherein the means for bending the spring members comprises:
a plunger, having a spring contact end and a mounting end defining a plunger axis and a passage along the plunger axis, the plunger contacting the bodies of the plurality of spring members at the spring contact end and coupled to the aperture frame near the mounting end so that the plunger axis coincides with the laser axis.

23. The apparatus of claim 22, wherein the aperture frame includes a threaded inner surface substantially parallel to the laser axis, and the plunger includes a threaded mounting surface near the mounting end adapted to couple with the threaded inner surface of the aperture frame, so that the plunger axis coincides with the laser axis and has an adjustable position relative to the aperture frame along the laser axis, whereby the adjustable amounts are set.

24. The apparatus of claim 22, wherein the aperture frame includes an inner surface substantially parallel to the laser axis, and the plunger includes a mounting surface near the mounting end coupled with the inner surface of the aperture frame to support the plunger so that the plunger axis coincides with the laser axis, and further including:
means, mounted with the frame and coupled to the plunger, for setting the adjustable amounts by positioning the plunger relative to the aperture frame along the laser axis.

25. The apparatus of claim 22, wherein the laser includes a partially evacuated chamber, and the plunger and the plurality of spring members are within the chamber.

26. The apparatus of claim 25, further including:
means, coupled to the plunger, for setting the adjustable amount of deflection from outside the chamber.

27. The apparatus of claim 22, wherein the laser includes a partially evacuated chamber, and the plunger and the plurality of spring members are within the chamber, and wherein:
the aperture frame includes an inner surface substantially parallel to the laser axis, and the mounting end of the plunger includes a mounting surface coupled with the inner surface of the aperture frame to support the plunger so that the plunger axis coincides with the laser axis; and further including:
means, mounted with the aperture frame and coupled to the plunger, for setting the adjustable amounts by positioning the plunger relative to the aperture frame along the laser axis from outside the chamber.

28. The apparatus of claim 19, wherein the aperture is essentially circular.

* * * * *